(12) United States Patent
Lee et al.

(10) Patent No.: US 9,266,537 B1
(45) Date of Patent: Feb. 23, 2016

(54) SYSTEM AND METHOD FOR CONTROLLING FAIL SAFE OF TRANSMISSION FOR VEHICLE

(71) Applicants: Hyundai Motor Company, Seoul (KR); Kia Motors Corporation, Seoul (KR)

(72) Inventors: Hak Sung Lee, Gyeonggi-Do (KR); Seong Hwan Kim, Daejeon (KR); Sang Lok Song, Gyeonggi-Do (KR); Gyeong Cheol Kim, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/559,486

(22) Filed: Dec. 3, 2014

(30) Foreign Application Priority Data

Sep. 17, 2014 (KR) ................. 10-2014-0123685

(51) Int. Cl.
| F16H 59/00 | (2006.01) |
| B60W 50/038 | (2012.01) |
| F16H 61/12 | (2010.01) |
| B60W 10/06 | (2006.01) |
| B60W 10/10 | (2012.01) |
| B60W 50/02 | (2012.01) |

(52) U.S. Cl.
CPC ............ B60W 50/038 (2013.01); B60W 10/06 (2013.01); B60W 10/10 (2013.01); B60W 50/0205 (2013.01); F16H 61/12 (2013.01); B60W 2050/021 (2013.01); B60W 2510/107 (2013.01); B60W 2710/06 (2013.01); B60W 2710/10 (2013.01); F16H 2061/124 (2013.01)

(58) Field of Classification Search
None
See application file for complete search history.

(56) References Cited

U.S. PATENT DOCUMENTS

| 6,612,967 | B2* | 9/2003 | Jeon | F16H 61/0437 477/141 |
| 6,620,076 | B1* | 9/2003 | Kawamura | B60W 10/06 477/107 |
| 6,647,326 | B2* | 11/2003 | Nakamori | B60K 6/365 477/158 |
| 8,229,637 | B2 | 7/2012 | Kobayashi et al. | |
| 8,747,074 | B2* | 6/2014 | Jeong | B60K 6/48 417/16 |
| 8,852,045 | B2* | 10/2014 | Kang | F16H 61/0031 475/117 |
| 8,909,402 | B2* | 12/2014 | Miyamoto | B60W 20/00 180/65.27 |
| 2012/0083978 | A1* | 4/2012 | Tajima | F16H 61/0213 701/55 |
| 2014/0129119 | A1* | 5/2014 | Park | F02N 19/00 701/113 |

FOREIGN PATENT DOCUMENTS

| JP | 2006-177412 A | 7/2006 |
| JP | 2009-121518 A | 6/2009 |
| KR | 10-2011-0062755 A | 6/2011 |

\* cited by examiner

*Primary Examiner* — Dirk Wright
(74) *Attorney, Agent, or Firm* — Mintz Levin Cohn Ferris Glovsky and Popeo, P.C.; Peter F. Corless

(57) ABSTRACT

A method and system for controlling a fail safe of a transmission for a vehicle are provided. The method includes detecting an oil temperature of the transmission for the vehicle and determining whether an oil pump has been driven for a set time or more based on the detected oil temperature. An output of an engine is then limited when the set time elapses.

20 Claims, 2 Drawing Sheets

| OIL TEMPERATURE (°C) / TIME (sec) | 90 | 100 | 110 | 120 |
|---|---|---|---|---|
| A | 40 | 30 | 20 | 10 |
| B | 50 | 40 | 30 | 20 |
| C | 60 | 50 | 40 | 30 |

SYSTEM AND METHOD FOR CONTROLLING FAIL SAFE OF TRANSMISSION FOR VEHICLE

CROSS REFERENCE TO RELATED APPLICATION

The present application claims priority of Korean Patent Application Number 10-2014-0123685 filed on Sep. 17, 2014, the entire contents of which application are incorporated herein for all purposes by this reference.

BACKGROUND

1. Technical Field

The present invention relates to a system and method for controlling a fail safe of a transmission for a vehicle, and more particularly, to a system and method for controlling a fail safe of a transmission for a vehicle capable of performing a fail safe control based on a temperature of the transmission during a failure in a transmission control unit (TCU).

2. Description of the Related Art

A transmission for a vehicle, particularly, an automatic transmission includes a transmission control unit (TCU) configured to change a shift level based on a driving state and a load state of the vehicle and sense a state of the transmission in real time, to perform a control of the transmission. The transmission is configured to operate as an intermediate leg that connects power of the vehicle to a driving shaft. Therefore, when a shift is not appropriately performed or when a transfer of the power is suddenly blocked, the transmission is not under a control of a driver. Therefore, driveability of the vehicle may be threatened and safety of a passenger may also be threatened.

Accordingly, a related art has developed a method "that includes performing communication between a TCU that is configured to operate a transmission and an electronic shift lever; drive a motor to pull an override cable connected to a parking sprag engaged with a parking gear when the electronic shift lever determines that the TCU is in a fail state after the communication; again determining, by the electronic shift lever, whether the TCU is in the fail state after the override cable is pulled; determining, by the electronic shift lever, a vehicle speed in response to determining that the TCU is in the fail state; and allowing, by the electronic shift lever, a driver to recognize that the vehicle speed is greater than a predetermined speed. However, even in the related art as described above, when a failure occurs in the transmission control unit while the vehicle is being driven, such that a hydraulic pressure change does not occur, safety may not be secured.

The matters described as the related art have been provided merely for assisting in the understanding for the background of the present invention and should not be considered as corresponding to the related art known to those skilled in the art.

SUMMARY

An object of the present invention is to provide a method for controlling a fail safe of a transmission for a vehicle that may prevent damage to a passenger, an oil pump, and a transmission by operating the transmission to be fixed at a predetermined shift level when an operation of a transmission control unit stops and gradually limiting an output of an engine to prevent an overload of the oil pump based on the operation of the transmission.

According to an exemplary embodiment of the present invention, a method for controlling a fail safe of a transmission for a vehicle may include: detecting, by a controller, an oil temperature of the transmission for the vehicle; determining, by the controller, whether an oil pump has been driven for a set time or more based on the detected oil temperature; and limiting, by the controller, an output of an engine when the set time elapses.

The method for controlling a fail safe of a transmission for a vehicle may further include determining, by the controller, whether a failure has occurred in a transmission control unit of the vehicle after the failure determination. In addition, the method for controlling a fail safe of a transmission for a vehicle may further include fixing, by the controller, a pressure applied to the transmission to a set pressure in response to determining that the failure has occurred in the transmission control unit.

The set time may be a time required for the oil pump to reach (e.g., increase to) at a set temperature. A plurality of set times may be provided for each oil temperature, and the plurality of set times in corresponding oil temperatures may be sequentially disposed. In the process of limiting the engine output, different engine output values may be output based on the plurality of set times that are sequentially disposed. In addition, the engine output limiting process may be performed to decrease the engine output values as the plurality of set times that are sequentially disposed are gradually increased. Information regarding the oil temperature of the transmission may be received, a plurality of set times required for the oil pump to reach at set temperatures for each oil temperature may be provided, and map data for outputting set engine output values based on the set times may be provided. An engine output value may be a set ratio value of a normal output value of the engine (e.g., an output value when no failure is experienced).

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein.

DETAILED DESCRIPTION

Figure 1:
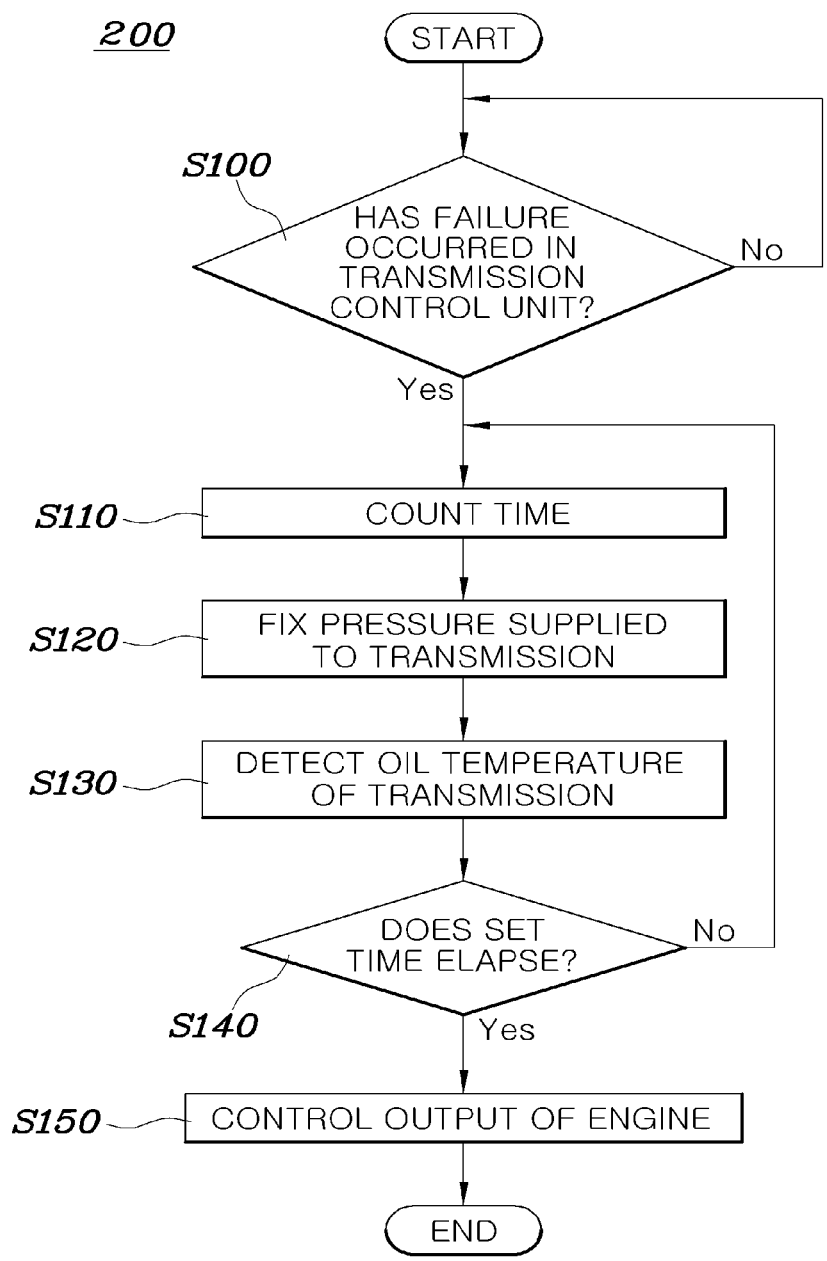
FIG. 1 is an exemplary flow chart of a method for controlling a fail safe of a transmission for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a method for controlling a fail safe of a transmission for a vehicle according to an exemplary embodiment of the present invention will be described with reference to the accompanying drawings.

FIG. 1 is an exemplary flow chart of a method for controlling a fail safe of a transmission for a vehicle according to an exemplary embodiment of the present invention. The method for controlling a fail safe of a transmission for a vehicle according to an exemplary embodiment of the present invention may include detecting (S130), by a controller 200, an oil temperature of the transmission for the vehicle; determining (S140), by the controller 200, whether an oil pump has been driven for a set time or more based on the detected oil temperature; and limiting (S150), by the controller 200, an output of an engine when the set time elapses. In particular, the method may further include determining (S100) whether a failure has occurred in a transmission control unit of the vehicle after determining the failure (S100).

The transmission control unit of the vehicle may be a TCU, and the failure determination may be determined with respect to various elements. When an abnormal operation pattern appears as compared with a normal state (e.g., when no failure is detected), for example, when a shift is not performed even at a set vehicle speed and acceleration pedal engagement amount, an abnormal state may be determined and thus, the failure may be determined to have occurred. However, the present invention is not limited to the above described abnormal states and various examples are possible.

Meanwhile, in response to determining that the transmission control unit is in a failure state, a pressure applied to the transmission may be fixed (S120), by the controller, to a set pressure. The set pressure may be set by performing an experiment several times and may be applied to fix a shift stage to a particular stage to allow a driver to move the vehicle to a safe location when the failure occurs in the transmission control unit while the vehicle is being driven. For example, the set pressure of about 16 bar may be applied. Various elements may be considered in determining the set pressure. Therefore, various examples are possible. The set pressure may be applied by operating the oil pump that provides the pressure to the transmission, and the oil pump may be an electronic oil pump.

In addition, the detection process (S130) may commence after the pressure has been fixed (S120). However, the detection process (S130) may also start before the pressure is fixed (S120), and an oil temperature value within the transmission may be received through a temperature sensor installed within the transmission. In particular, measurement by the temperature sensor may be performed, and a measured value may be detected and used in the detection process (S130).

Meanwhile, in the determination process (S140), the set time may be a time required for the oil pump to reach (e.g., increase to) at a set temperature. In particular, for the determination process (S140), a time required for the oil pump to reach at a preset oil temperature of the transmission may be measured (S110) and stored as a data map. In addition, in response to determining that the failure has occurred in the transmission control unit, a time from a failure point or a point in time in which the oil pump supplies the set pressure may be measured (S110), the controller may be configured to determine whether the measured time exceeds the set time output from map data for the detected oil temperature, and when the measured time exceeds the set time, the limiting process (S150) may be performed by the controller.

Figures 2, 3:
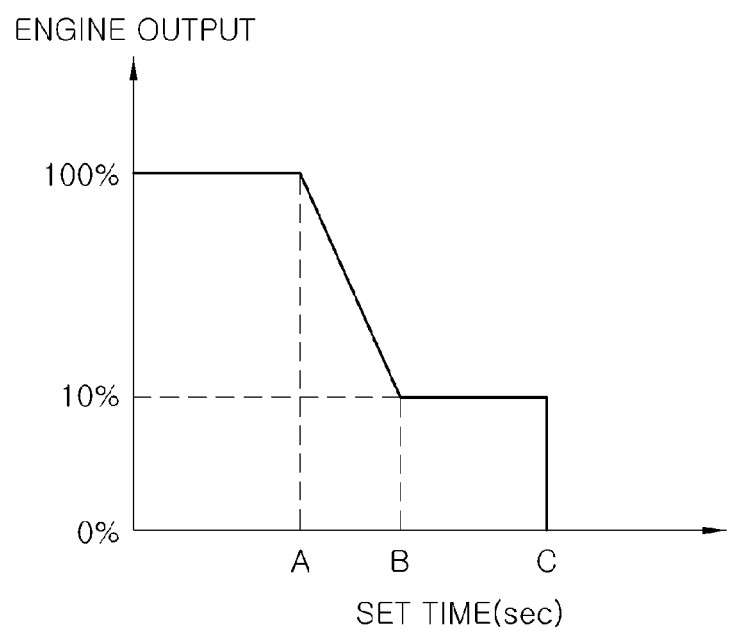
FIG. 2 is an exemplary diagram showing a relationship between an oil temperature of the transmission and a set time among map data of the method for controlling a fail safe of a transmission for a vehicle according to an exemplary embodiment of the present invention.
FIG. 3 is an exemplary diagram showing a relationship between a set time and an engine output value among the map data of the method for controlling a fail safe of a transmission for a vehicle according to an exemplary embodiment of the present invention.

A plurality of set times may be set for each oil temperature, and the plurality of set times in each detected oil temperature may be sequentially disposed. This will be described with reference to FIG. 2. In particular, FIG. 2, illustrates an exemplary diagram showing a relationship between an oil temperature of the transmission and a set time among map data of the method for controlling a fail safe of a transmission for a vehicle according to an exemplary embodiment of the present invention, shows a plurality of set times set for each of a plurality of oil temperatures in a table form. As described above, the preset map data may be configured to store the plurality of set times required for the oil pump to reach a plurality of preset temperatures for each oil temperature therein, and when the set time elapses, the limiting process (S150) may be performed.

A plurality of set temperature values that become a reference of the set times and at which the oil pump reaches may be temperatures that cause the oil pump to be over-heated, may be gradually increased values, and may be set by an experiment. Meanwhile, in the limiting process (S150), different engine output values may be derived based on the plurality of set times that are sequentially disposed. In particular, as shown in FIG. 3, which illustrates a diagram showing a relationship between a set time and an engine output value among the map data, the set times may be sequentially disposed and gradually increased and the corresponding set temperatures of the oil pump may also be increased as the times are increased.

Further, data for outputting engine output values based on the set times may be stored as the map data as shown in FIG. 3, and the engine output values may be decreased as the plurality of set times that are sequentially disposed are gradually increased. In the limiting process (S150), the control for the output of the engine may be performed based on the engine output values output from the map data.

The engine output value may be a set ratio value of a normal output value of the engine, and may be a value calculated based on a set percentage value in an engine output value when the transmission control unit is in a normal state. For example, as shown in FIG. 3, a control may be performed to decrease the engine output values in a sequence of 90%, 80%, . . . of the engine output value in the normal state after a set time A, and an engine output value that corresponds to 10% of the engine output value in the normal state may be output in a set time B. The output of the engine input to the transmission may be forcibly decreased, thus allowing the driver to immediately recognize an abnormal state of the transmission, and the output of the engine may be gradually decreased, to prevent the overheat of the oil pump and secure a time required for the driver to move the vehicle to a safe location.

According to the method for controlling a fail safe of a transmission for a vehicle configured in the structure as described above, a passenger may recognize the abnormal state of the transmission when the vehicle is being driven, and the driving may be gradually limited under a control of the driver, thus securing safety of the passenger. In addition, the overheat of the oil pump may be prevented to thus prevent damage to the oil pump. Further, since the oil temperature of the transmission may be measured to estimate the temperature of the oil pump and control a torque of the engine, a temperature sensor configured to prevent the overheat of the oil pump may be omitted and a logic for determining whether a failure has occurred in the temperature sensor of the oil pump may also be omitted, thus decreasing a production cost and improving productivity.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A method for controlling a fail safe of a transmission for a vehicle, comprising:
    detecting, by a controller, an oil temperature of the transmission for the vehicle;
    determining, by the controller, whether an oil pump has been driven for a set time or more based on the detected oil temperature; and
    limiting, by the controller, an output of an engine when the set time elapses.

2. The method for controlling a fail safe of a transmission for a vehicle of claim 1, further comprising:
    determining, by the controller, whether a failure has occurred in a transmission control unit of the vehicle after the failure determination.

3. The method for controlling a fail safe of a transmission for a vehicle of claim 2, further comprising:
    fixing, by the controller, a pressure applied to the transmission to a set pressure in response to determining that the failure has occurred in the transmission control unit.

4. The method for controlling a fail safe of a transmission for a vehicle of claim 1, wherein the set time is a time required for the oil pump to reach a set temperature.

5. The method for controlling a fail safe of a transmission for a vehicle of claim 1, wherein a plurality of set times are provided for each oil temperature, and the plurality of set times in corresponding oil temperatures are sequentially disposed.

6. The method for controlling a fail safe of a transmission for a vehicle of claim 5, wherein different engine output values are output based on the plurality of set times that are sequentially disposed.

7. The method for controlling a fail safe of a transmission for a vehicle of claim 6, further comprising:
    decreasing, by the controller, the engine output values as the plurality of set times that are sequentially disposed are gradually increased.

8. The method for controlling a fail safe of a transmission for a vehicle of claim 1, wherein information regarding the oil temperature of the transmission is received, a plurality of set times required for the oil pump to reach set temperatures for each oil temperature are provided, and map data for outputting set engine output values based on the set times are provided.

9. The method for controlling a fail safe of a transmission for a vehicle of claim 1, wherein an engine output value is a set ratio value of a normal output value of the engine.

10. A system for controlling a fail safe of a transmission for a vehicle, comprising:
    a memory configured to store program instructions; and
    a processor configured to execute the program instructions, the program instructions when executed configured to:
        detect an oil temperature of the transmission for the vehicle;
        determine whether an oil pump has been driven for a set time or more based on the detected oil temperature; and
        limit an output of an engine when the set time elapses.

11. The system for controlling a fail safe of a transmission for a vehicle of claim 10, wherein the program instruction when executed are further configured to:
    determine whether a failure has occurred in a transmission control unit of the vehicle after the failure determination.

12. The system for controlling a fail safe of a transmission for a vehicle of claim 11, wherein the program instruction when executed are further configured to:
    fix a pressure applied to the transmission to a set pressure in response to determining that the failure has occurred in the transmission control unit.

13. The system for controlling a fail safe of a transmission for a vehicle of claim 10, wherein the set time is a time required for the oil pump to reach a set temperature.

14. The system for controlling a fail safe of a transmission for a vehicle of claim 10, wherein a plurality of set times are provided for each oil temperature, and the plurality of set times in corresponding oil temperatures are sequentially disposed.

15. The system for controlling a fail safe of a transmission for a vehicle of claim 14, wherein different engine output values are output based on the plurality of set times that are sequentially disposed.

16. The system for controlling a fail safe of a transmission for a vehicle of claim 15, wherein the program instruction when executed are further configured to:
    decrease the engine output values as the plurality of set times that are sequentially disposed are gradually increased.

17. A non-transitory computer readable medium containing program instructions executed by a controller, the computer readable medium comprising:
   program instructions that detect an oil temperature of the transmission for the vehicle;
   program instructions that determine whether an oil pump has been driven for a set time or more based on the detected oil temperature; and
   program instructions that limit an output of an engine when the set time elapses.

18. The non-transitory computer readable medium of claim 17, further comprising:
   program instructions that determine whether a failure has occurred in a transmission control unit of the vehicle after the failure determination.

19. The non-transitory computer readable medium of claim 18, further comprising:
   fix a pressure applied to the transmission to a set pressure in response to determining that the failure has occurred in the transmission control unit.

20. The non-transitory computer readable medium of claim 17, wherein the set time is a time required for the oil pump to reach a set temperature.

* * * * *